Dec. 7, 1965  W. J. H. CHANG  3,221,529
QUICK MASS ASSEMBLY OF MILL HOUSINGS
Filed Oct. 19, 1961  8 Sheets-Sheet 3

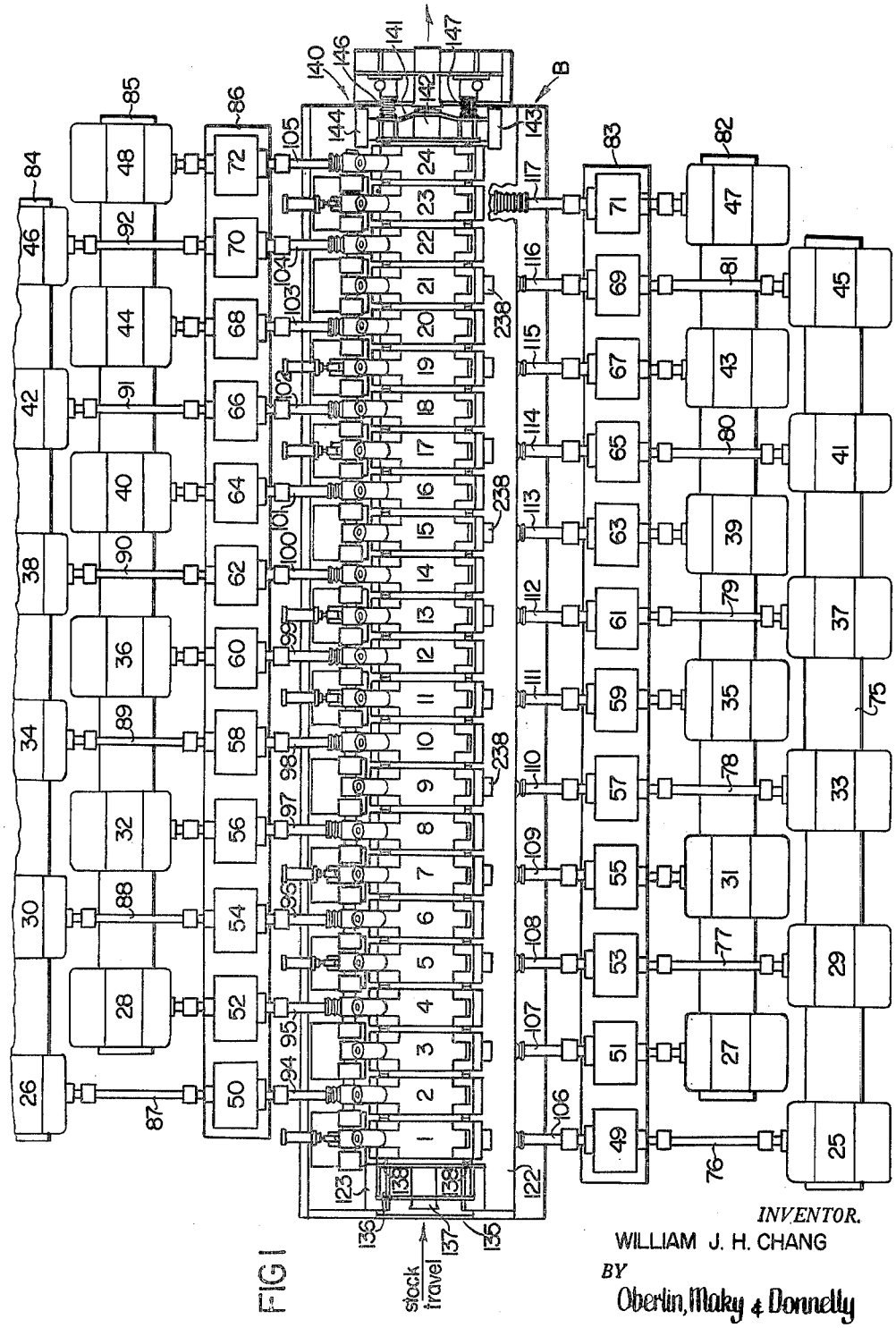

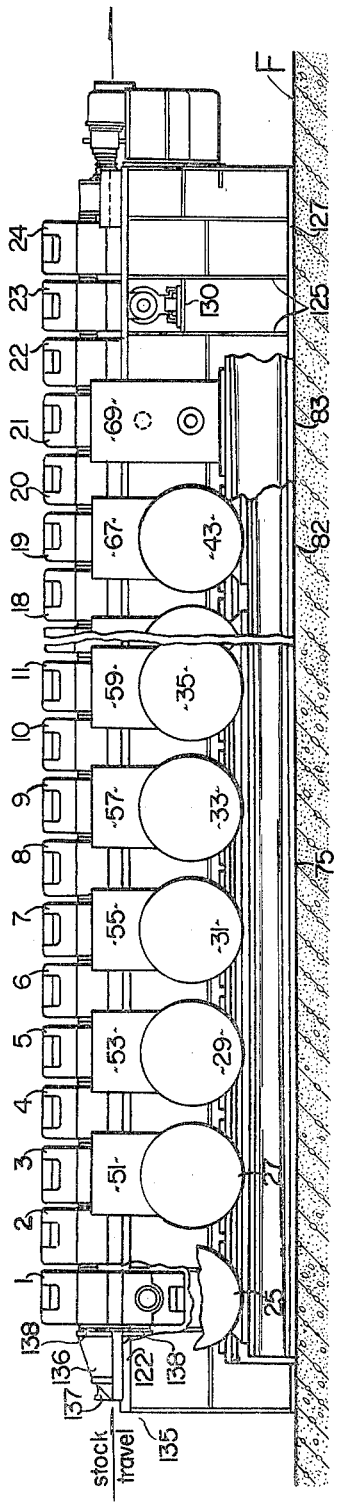

INVENTOR.
WILLIAM J. H. CHANG
BY
Oberlin, Maky & Donnelly
ATTORNEYS

Dec. 7, 1965 W. J. H. CHANG 3,221,529
QUICK MASS ASSEMBLY OF MILL HOUSINGS
Filed Oct. 19, 1961 8 Sheets-Sheet 4

*INVENTOR.*
WILLIAM J. H. CHANG
BY Oberlin, Maky & Donnelly
ATTORNEYS

Dec. 7, 1965   W. J. H. CHANG   3,221,529
QUICK MASS ASSEMBLY OF MILL HOUSINGS
Filed Oct. 19, 1961   8 Sheets-Sheet 5

INVENTOR.
WILLIAM J. H. CHANG
BY
Oberlin, Maky & Donnelly
ATTORNEYS

Dec. 7, 1965  W. J. H. CHANG  3,221,529
QUICK MASS ASSEMBLY OF MILL HOUSINGS
Filed Oct. 19, 1961  8 Sheets-Sheet 8
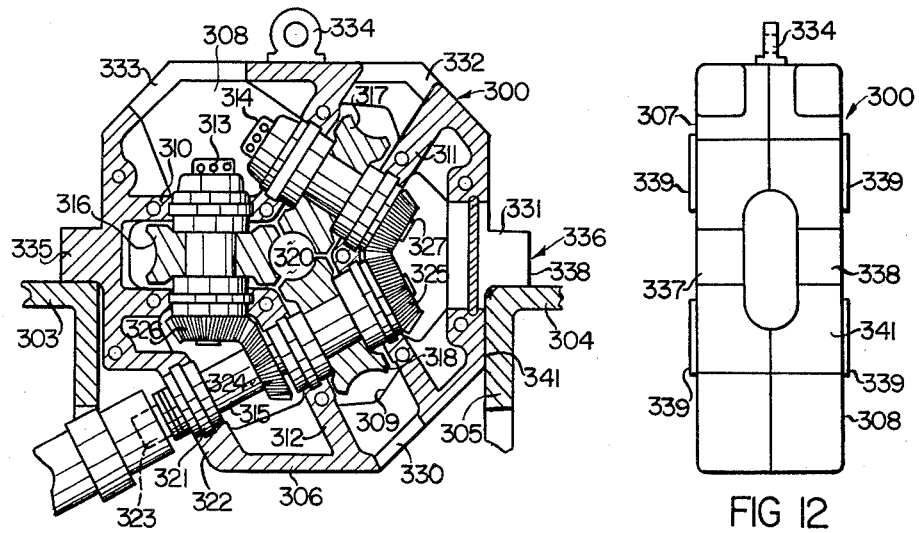
FIG 11
FIG 12
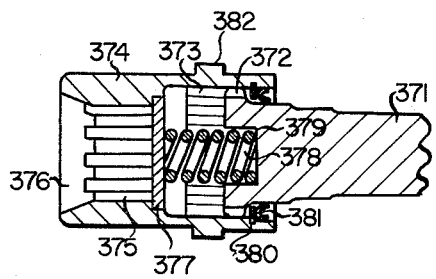
FIG 15
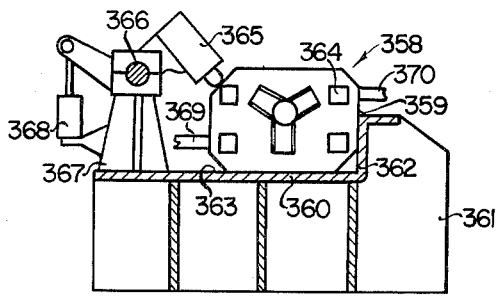
FIG 14
INVENTOR.
WILLIAM J. H. CHANG
BY
Oberlin, Maky & Donnelly
ATTORNEYS

United States Patent Office 3,221,529
Patented Dec. 7, 1965

3,221,529
QUICK MASS ASSEMBLY OF MILL HOUSINGS
William J. H. Chang, Lakewood, Ohio, assignor to The Yoder Company, Cleveland, Ohio, a corporation of Ohio
Filed Oct. 19, 1961, Ser. No. 146,277
27 Claims. (Cl. 72—224)

This invention relates, generally, as indicated, to a quick mass assembly of mill housings and more particularly to a method of and apparatus for quickly and easily constructing such assembly.

In forming mills such as modern, tube, hot, stretch reducing mill, roll housings are generally very closely fitted to a base and closely confined both laterally and longitudinally of the centerline of the mill. Such close confinement of the roll housings is required to keep the housings in parallel and also to anchor the individual housings to the base to withstand the substantial pulling force in a longitudinal direction between successive roll housings. This very close clearance required properly to confine such housings demands a great deal of effort and time to assemble and disassemble each roll housing on the base and it is for all practical purposes impossible to assemble or disassemble more than one roll housing at a time. A modern, hot, stretch reducing, tube mill may employ, for example, as many as 24 roll housings, and since product size change over is frequent in such mills, it can readily be seen that the mill down-time required for the replacement or rearrangement of the roll housings is substantial.

It is accordingly a principal object of the present invention to provide a method of and apparatus for quickly changing such roll housings while still maintaining the critical alignment required with respect to the mill centerline, and the proper housing spacing.

It is another main object to provide a method of and apparatus for constructing a forming mill which will save time and labor in the initial assembly and also in any future disassembly or replacement of one or all of the roll housings in such mill.

It is a further important object to provide a forming mill wherein the roll housings may be placed on the base in groups, the size of such groups being limited only by the capacity of an overhead crane or the like.

It is another object to provide a roll housing for a forming mill or the like wherein the rolls may be driven from either side of the mill or from the top or bottom of the housing.

It is yet another object to provide a quick mass assembly for such housings wherein the overall thickness of the housing will determine the spacing therebetween.

It is a still further object to provide supporting means for such housings wherein they may quickly and easily be stacked and clamped together.

Still another object is the provision of a quick disconnect coupling for the drive of such housings.

A further object is the provision of quick-acting clamps which will longitudinally align such housings with the centerline of the mill and stack and clamp such housings together anchoring the housings on the base to resist forces occurring in any direction.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a top plan view partially broken away of a mill in accordance with the present invention;

FIG. 2 is a fragmentary side elevation of such mill partially broken away;

FIG. 3 is a transverse section of mill taken substantially on the line 3—3 of FIG. 4;

FIG. 11 is a fragmentary transverse section illustrating another form of roll housing;

FIG. 12 is an end elevation of such housing taken from the right in FIG. 11;

FIG. 14 is a fragmentary transverse section showing another form of the present invention employing a modified base receptacle construction; and FIG. 15 is a transverse section of a further form of shaft coupling that may be employed with the present invention.

*The assembled mill (FIG. 1 embodiment)*

Figure 4:
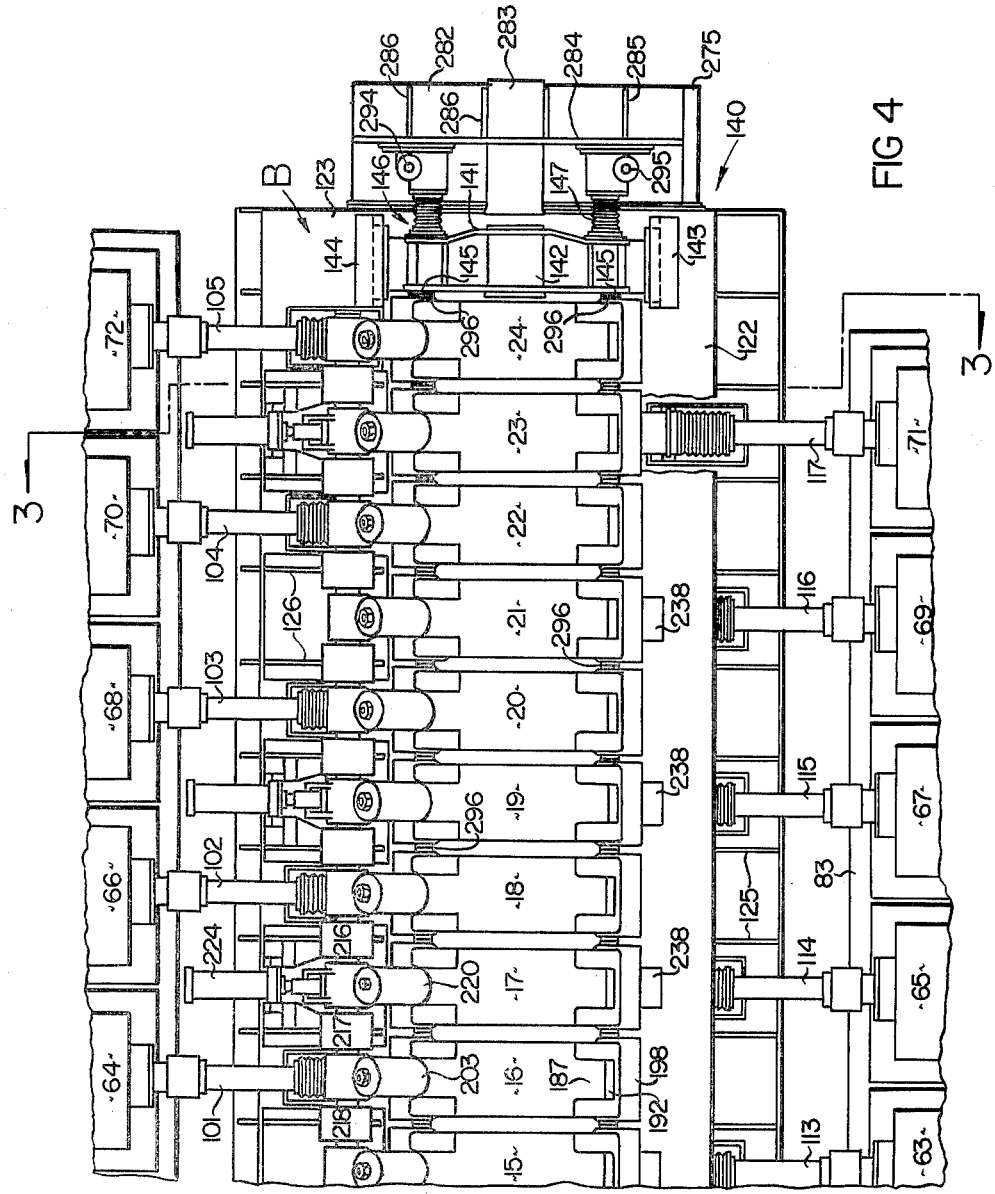
FIG. 4 is an enlarged fragmentary top plan view of such mill partially broken away.

Referring now to the annexed drawings and more particularly to the embodiment illustrated in FIGS. 1, 2, 3 and 4, there is shown the general arrangement of a hot stretch tube reducing mill. In the illustrated mill, there is employed a total of twenty-four roll housings labeled 1 through 24 and arranged seriatim in the direction of stock travel. Each of the roll housings contains three tube engaging rollers which are driven by respective drive motors 25 through 48. As seen in FIG. 1, the drive motors, which may, for example, be 200 H.P. 650/1800 r.p.m. D.C. motors, are arranged so that the odd numbered motors are on one side of the mill and the even numbered motors are on the other side of the mill. Thus the drive motors and the drives for alternate roll housings are on alternate sides of the mill. In addition, each successively odd numbered drive motor and even numbered drive motor is transversely offset from its next adjacent drive motor. The drive shafts for each of the drive motors are coupled to the input drive shafts of speed reducers 49 through 72, the output shafts of which are coupled to the respective roll housings. In this manner, the odd numbered drive motors 25, 29, 33, 37, 41 and 45 may be mounted on an elongated pedestal 75 and connected to the respective speed reducers 49, 53, 57, 61, 65 and 69 by elongated drive shafts 76, 77, 78, 79, 80 and 81. The drive shafts of the odd numbered motors 27, 31, 35, 39, 43 and 47 may be coupled directly to the respective speed reducers 51, 55, 59, 63, 67 and 71. Such motors are mounted on an elongated pedestal 82 which is somewhat closer to the mill centerline than the pedestal 75. The odd numbered speed reducers 49 through 71 are mounted on a pedestal 83 which is even closer to the mill centerline. Similarly, the even numbered motors 26, 30, 34, 42 and 46 are mounted on a pedestal 84 and the even numbered motors 28, 32, 36, 40, 44 and 48 are mounted on a pedestal 85 which is closer than the pedestal 84 to the mill centerline. Similarly, the even numbered speed reducers are mounted on a pedestal 86 and alternate even numbered speed reducers are connected to the motors on pedestal 84 by means of the elongated drive shafts 87 through 92. All of the drive motors may be identical in form and similarly all of the speed reducers may be identical in form.

As seen in FIG. 3, the pedestals 75, 82, 83, 86, 85 and 84 for the drive motors and speed reducers may be mounted on the mill floor F which may include an elevated portion 93 on the right hand side of the mill as seen in FIG. 3 or the top of the mill as seen in FIG. 1. This elevated portion serves to elevate the output shafts 94 through 105 of the even numbered speed reducers above the output shafts 106 through 117 for the odd numbered speed reducers on the opposite side of the mill. The reason for this difference in elevation of the output shafts of the alternately numbered speed reducers will hereinafter become evident.

The mounting of the roll housings

The roll housings 1 through 24 are mounted on a base B which includes a longitudinally extending well or recess W which constitutes a receptacle for the roll housings. The base is comprised of two longitudinally vertically extending plates 120 and 121 which terminate in oppositely directed horizontally extending top shelves 122 and 123 respectively. A series of transversely extending plates 124 may be provided extending between the upstanding plates 120 and 121 with the top edges of such plates 124 defining the bottom of the seat or well W. Additionally, vertical transversely extending series of plates 125 and 126 may be provided on each side of the base extending from the top shelves 122 and 123 to the footings 127 on which the base is mounted upon the floor F. Further, vertical extending plates 128 and 129 may also be provided extending between each of the plates 125 and 126. Horizontal shelves 130 and 131 may also be provided extending between such plates and as seen in FIG. 2, such horizontally extending shelves between such plates may be alternately vertically offset. These shelves serve to support the drive shaft coupling actuating mechanism as will hereinafter be described.

It can now be seen that the base B is comprised of a number of horizontally and vertically extending plates which may be welded together to form a rigid and sturdy support for the roll housings 1 through 24 with the base being securely anchored to the mill floor F through the footings 127. A longitudinally extending sump or drain 132 may be provided directly beneath the well W to act as a sump for a coolant fluid or the like. As shown at 133 and 134, the inside corners of the well W may be reinforced by making the tops of the plates 120 and 121 of thicker material as well as the horizontally extending shelves 122 and 123. The stock entry end 135 of the base B is provided with a bridge 136 firmly secured to and extending between the shelves 122 and 123. The bridge may be provided with an entry tube guide 137 and such bridge is provided with four contact pads 138 facing in the direction of the stock travel adapted to contact opposed contact pads on the first roll housing 1 supported on the shelves 122 and 123. In this manner, the bridge 136 provides a rigid dead end for the base B against which the roll housings 1 through 24 may be stacked and clamped.

The exit end 140 of the base B is provided with a similar bridge 141 which has a cylindrical exit tube guide 142 therein. This bridge, however, is mounted for horizontal movement in guides 143 and 144 secured to the shelves 122 and 123 respectively. Such bridge is similarly provided with four contact pads 145 which are positioned opposed to the similar contact pads provided on the last roll housing 24. The bridge 141 is actuated for movement by two screw jacks 146 and 147 driven by a hydraulic motor as will hereinafter be described.

The roll housings (FIG. 1 embodiment)

Figure 6:
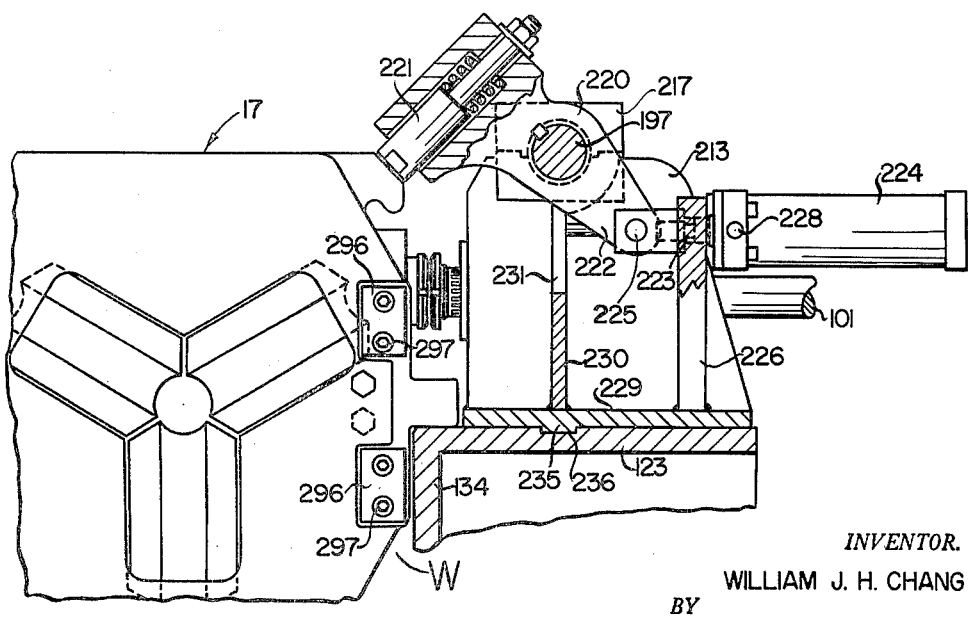
FIG. 6 is a vertical section taken substantially on the line 6—6 of FIG. 5.
Figure 7:
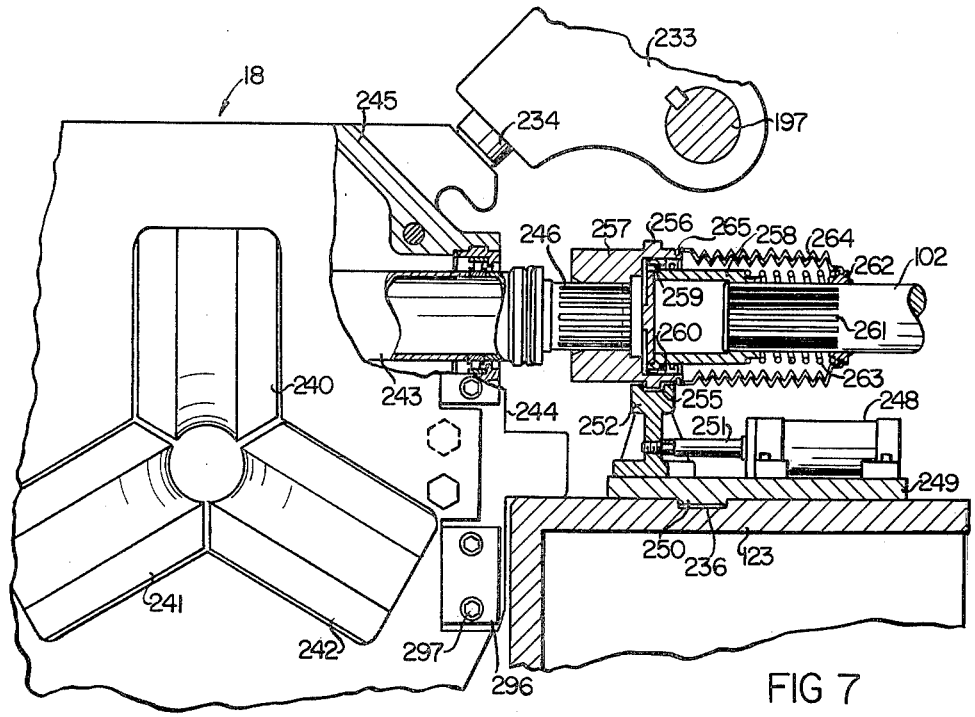
FIG. 7 is a vertical section taken substantially on the line 7—7 of FIG. 5.
Figure 10:
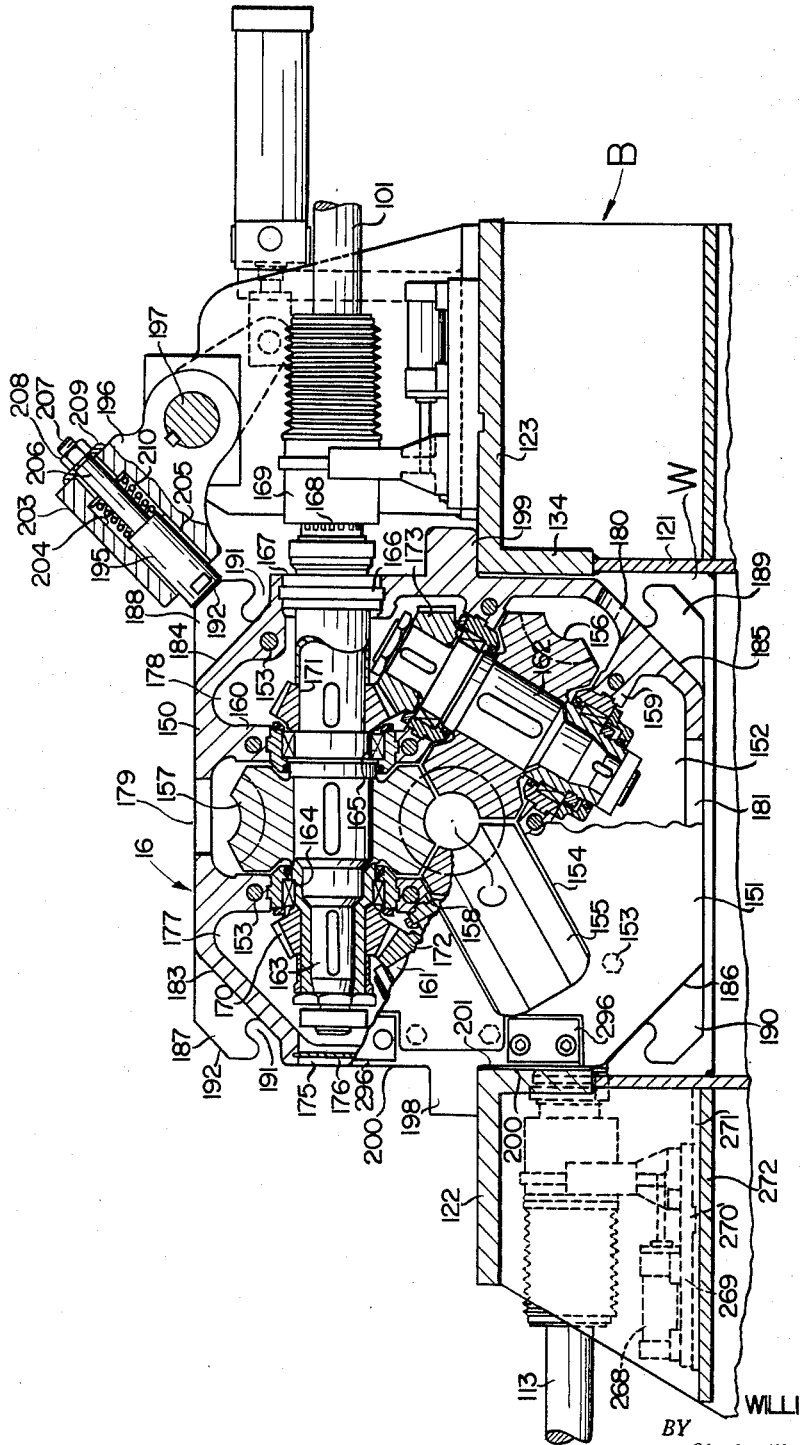
FIG. 10 is a vertical section taken substantially on the line 10—10 of FIG. 5 showing the details of the roll housing.

Referring now additionally to FIGS. 6, 7 and 10, it will be seen that aside from the roll diameters and the tube-engaging contours thereof, each of the roll housings will be substantially identical in form. As seen in FIG. 10, the roll housing 16, for example, comprises a frame 150 to each side of which is secured end plates 151 and 152. Such end plates may be fastened to the frame by means of a series of screws 153 and each plate is provided with a Y-shape opening 154, with each leg of the opening accommodating one of the forming rollers 155, 156 and 157. Adjacent the edges of such openings, the frame provides obtuse angle webs 158, 159 and 160 which properly space the plates 151 and 152 apart and also support the bearings for the respective roll shafts 161, 162 and 163. The horizontally extending shaft 163 for the roll 157, in addition to being mounted in the bearings 164 and 165, may also be mounted in bearing 166 within the opening 167 in the side wall of the frame. Such shaft is provided with a splined extension 168 which will mesh with the extensible portion 169 on the drive shaft 101 of the speed reducer 64. In this manner, the roll shaft 163 will be coupled in driving engagement directly with the shaft 101 of the speed reducer. In order to impart such drive to the rolls 155 and 156, the shaft 163 has keyed thereto bevel gears 170 and 171 which mesh respectively with bevel gears 172 and 173 secured to the roll shafts 161 and 162 respectively. In this manner, all of the rolls 155 through 157 will be driven in unison through the drive shaft 101. The opposite side of the frame 150 may be provided with an opening 175 which in the illustrated embodiment is sealed by the closure member 176. In this manner, the chambers 177 and 178 within the roll housings which enclose the meshing gears 170, 172 and 171, 173, respectively may be properly sealed to preclude the entrance of foreign matter. The remaining chambers within the roll housing may be provided with ports as shown at 179, 180 and 181 to permit coolant fluid or the like readily to drain therefrom.

The frame 150 is provided with beveled corners 183, 184, 185 and 186, each provided with extensions 187 through 190 which are somewhat more narrow than the roll housings and which serve two functions. Such extensions are provided with undercut portions as shown at 191 whereby a lifting device may readily be fastened to the roll housing so that it may be removed from or placed within the well W in the base B. The hook-like projections 187 through 190 accommodate cables from overhead cranes or special slings whereby groups of such roll housings may be placed in the base B. The number of housings which can be placed simultaneously will, of course, be governed only by the lifting capacity of the overhead crane.

In addition to the hook function which facilitates handling of the roll housings, the projections 187 through 190 are provided with beveled top surfaces 192 which present extended frame surfaces at the four corners of the roll housing which are adapted to be contacted by spring-loaded push rods 195 which are mounted in lever housings 196 which are in turn keyed to a plurality of aligned shafts 197 mounted at the side of the roll stand.

The frame 150 is also provided with two oppositely extending supporting ears 198 and 199 which are horizontally aligned with the centerline C of the roll housing. The centerline of the roll housing is, of course, the center of the circular opening through the roll housing provided by the arcuate surfaces which contact the tube on the rolls within the cluster. The ears, of course, are an integral part of the frame and overlie the hornzontally extending shelves 122 and 123 so that the roll housing will be supported thereon with almost half of the housing extending within the well W. The center of gravity of the roll housings is thus substantially in the plane of support.

The only externally finished surface on the casting of the frame 150 for the roll housing may be the surface 200. This surface cooperates with the finished side aligning surface 201 on the inside of the reinforced portions 133 of the shelf 122 so that the pusher bar 195 engaging the surface 192 of the extension 188 will cause the roll housing to be moved transversely to cause the surface 200 to abut against the surface 201 thus properly aligning the centerline C of the roll housing with the centerline of the mill.

The pusher bar 195 is mounted in a cylindrical housing portion 203 of the lever 196 which is keyed to shaft 197. The chamber 204 within such housing portion is provided with a guide bushing 205 which closely receives and guides the pusher bar for axial movement. The pusher bar includes a reduced diameter portion 206 terminating in a threaded portion 207 having nut 208 secured thereon. This reduced diameter portion 206 extends through an opening 209 in the back of the cylindrical housing portion of the link and a compression spring 210 is provided between the shoulder on the pusher bar and the shoulder in the chamber 204. It can now be seen that rotation of the shaft 197 in a counterclockwise direction will cause the pusher bar 195 to engage the beveled surface 192 of the extension 188 pushing and clamping the roll housing against the opposite finished side of the well W of the base B.

Figure 5:
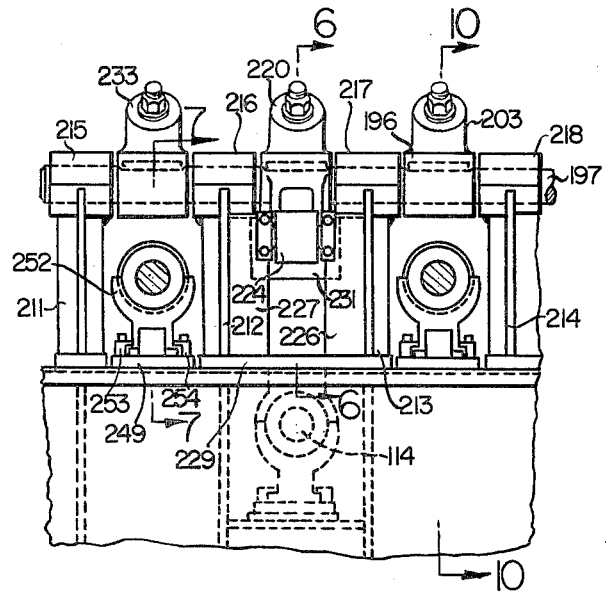
FIG. 5 is an enlarged fragmentary side elevation illustrating the horizontally staggered roll drive arrangement and details of the roll housing clamps.

As seen in FIG. 5, the shaft 197 may be mounted in brackets 211, 212, 213 and 214, the tops of which are provided with cylindrical shaft receiving bearing caps 215, 216, 217 and 218 respectively. The shaft 197 may be driven for oscillation by the lever 220 of the pusher bar 221 for the roll housing 17. This lever is also keyed to the shaft 197 and is provided with an extension 222 which is connected to the rod 223 of hydraulic piston-cylinder assembly 224 as shown at 225. Such piston-cylinder assembly is pivotally mounted between brackets 226 and 227 as shown at 228, such brackets being welded to the base plate 229 supporting the shaft support brackets 212 and 213. A reinforcing plate 230 extending between the shaft support brackets 212 and 213 may be provided with an opening 231 so that the pivot 212 can move in a counterclockwise direction through such opening to pivot the shaft and thus the pusher bars clear of the roll housing.

The pusher bar lever 233 for the pusher bar 234 for the roll housing 18, as seen in FIG. 7, will be identical in form to the lever 196 for the pusher bar 195 for the roll housing 16.

The heavy duty compression springs provided in each of the pusher heads makes it possible that more than one housing can be clamped tightly at the same time with but one piston-cylinder assembly 224. It is noted that the shaft 197 may extend through four such pusher heads, all to be operated by a single piston-cylinder assembly. It will, of course, be understood that the shaft 197 may, if desired, extend the entire length of the mill, but preferably a series of relatively short shafts serving three or possibly four pusher heads is preferred. These several short shafts facilitate the adjustment of the brackets 211, 212, 213 and 214 which are mounted on the shelf 123. As seen in FIG. 6, the bracket mounting plates are provided with a tongue 235 which engages a groove 236 in the shelf 123. In this manner, if desired, the brackets and entire pusher bar assembly may be adjusted longitudinally of the mill.

Referring to FIG. 1, it will be seen that the illustrated embodiment employing twenty-four roll housings employs a spring loaded pusher bar for each of said roll housing, there being a total of eight hydraulic piston-cylinder assemblies actuating such pusher bars. This means that each hydraulic piston-cylinder assembly will preferably actuate three such pusher bars and such piston-cylinder assemblies may be controlled to operate simultaneously or individually. Such piston-cylinder assemblies not only will apply the required force to the pusher bars to shove the roll housings against the finished well surface properly to position the roll housing centerline, but upon extension, will also cause the pusher bars to pivot vertically clear of the well so that the roll housings may readily be removed from the well when the drive couplings are disconnected.

*Drive couplings (first embodiment)*

Referring now particularly to FIGS. 5, 7 and 10, it will be seen that the horizontally extending roll shaft in each of the roll housings may be coupled quickly and conveniently to the provided drive shafts either above or below the horizontally extending base shelves on either side of the mill. The housings are thus designed to be sufficiently symmetrical so that they may be driven from the right as shown, for example, in FIG. 10, or rotated about a vertical axis and driven from the left. Also, the roll housings may be driven from the top or the bottom by rotating such housings about a horizontal axis. For example, the roll housing 16 may be driven from the drive shaft 101 as shown in FIG. 10 or rotated in a counterclockwise direction to be driven from the drive shaft 113 for the next preceding roll housing.

FIG. 7 illustrates one form of quick disconnect drive assembly in section between the drive shaft 102 and the roll housing 18 and FIG. 10 illustrates in elevation the quick disconnect coupling between the drive shaft 101 and the roll housing 16. In these alternate even numbered roll housings, the top roll of the cluster will have its shaft extending horizontally out through the side wall of the housing to be connected to the higher drive shafts on the right of the mill as seen in FIG. 3. The odd numbered roll housings as seen, for example, in FIG. 3 will be inverted to have the bottom roll of the cluster with its shaft extending horizontally to project through the finished side wall of the roll housing through an opening in the shelf 122 to be coupled to the drive shafts 106 through 117. As seen in FIGS. 1 and 4, the shelf 122 may be provided with openings 238 which will accommodate the splined projecting ends of the horizontally extending shafts of the bottom rolls in each of the clusters in the odd numbered roll housings as such housings are lowered into the well W. The supporting ears on each of the housings, of course, are wider than the openings properly firmly to support such housings on the shelf 122.

Referring now particularly to FIG. 7, it will be seen that the roll housing 18, like the roll housing 16, includes a roll cluster of three rolls 240, 241 and 242 which are drivingly interconnected and the top roll 240 is provided with a shaft 243 which projects through the end wall 244 of the frame 245 of the housing 18. The end of the shaft 243 is splined as shown at 246 in a manner identical to the splining of the end of shaft 163 of the roll housing 16.

A double-acting air or hydraulic cylinder 248 is secured to a plate 249 which is mounted on the shelf 123. Such plate is provided with a tongue 250 engaging the groove 236 which may be provided in the top surface of such shelf and in this manner, the plate 249 and the cylinder thereon may be adjusted longitudinally of the mill with the tongue within the groove.

The rod 251 of the piston-cylinder assembly 248 is threadedly secured to a coupling shifter 252 which is mounted in gibs or guides 253 and 254 mounted on the plate 249. As seen in FIG. 5, the coupling shifter is an upstanding semicircular member having a semicircular groove 255 therein. Such groove loosely engages an annular tongue 256 on an internally splined coupling hub body 257. It is noted that the ends of the lands on the splined end 246 of the shaft 243 are beveled and the grooves in the internally splined coupling hub body 257 are outwardly flared to facilitate the quick and easy mating of the splined components. Axially flexible with respect to and yet secured to rotate with the coupling hub body 257 is an internally splined connector 258. Such connector may be provided with arcuate teeth 259 engaging in internal grooves 260 in the end of the coupling hub body 257. The internally splined connector 258 mates with the splined end 261 of the drive shaft 102. A collar 262 may be welded or otherwise secured to the drive shaft 102 and such collar provides a shoulder for compression spring 263 which extends between such collar and a shoulder on the connector 258. The collar also serves as an anchor for one end of a flexible, expansible boot 264, the opposite end of which is anchored in the coupling hub body 257 as shown at 265. The boot serves to protect the spline 261 from dust and dirt.

To disconnect the coupling shown in FIG. 7, the double-acting piston-cylinder assembly 248 will be caused to retract the rod 251 moving the coupling shifter 252 to the right. This in turn will cause the internally splined coupling hub body 257 and the splined connector 258 connected thereto to move to the right. Such movement causes the connector to move on the splined portion 261 of the driver shaft 102 compressing spring 263. This continues until the coupling hub body 257 vertically clears the driven splined shaft end 246 of the roll housing 18. With the pusher bars vertically clear of the roll housings and upon completion of the removal and/or replacement of such roll housings, the reversals of the fluid pressure in the piston-cylinder assembly will, with the aid of compressed spring 263, push the internally splined connector 258 and the coupling hub body 257 to the left until contact is made with the splined end 246 of the shaft 243. If the splines are aligned, the coupling hub body 257 will complete the connection. If the splines are misaligned, a slight jog of the motor 42 will complete the alignment and the coupling hub body 257 will slide to complete the connection.

The groove 255 of the coupling shifter 252 will not be in contact with the tongue 256 on the coupling hub body 257 when the coupling is completed. When the piston-cylinder assembly drives the splined members 246 and 257 into engagement, the coupling hub body will be elevated slightly to provide a clearance between the shifter and the coupling hub body. The coupling shifter will, however, support the weight of the hub 257 and the connector 258 when the coupling is disengaged.

The quick disconnect coupling between the shaft 163 of the roll housing 16 and the drive shaft 101 as seen in FIG. 10 will be identical in form to the quick disconnect coupling just described. The quick disconnect couplings which are beneath the shelf 122 for the drive shafts 106 through 117 may also be identical in form and operation. The piston-cylinder assembly 268 for the operation of such quick disconnect assemblies may be mounted on plates 269 and may be longitudinally adjusted by means of the tongue and groove connection 270 between such plates 269 and the plate 271 mounted on the shelf 272. In this manner, there is afforded a slight longitudinal adjustment of each of the quick disconnect assemblies for the drive shafts 106 through 117.

*Power operated end jacks*

The function of the power operated end jacks 146 and 147 is to provide flexibility in the length of the longitudinal opening of the well in the mill base to allow a mass deposit of the roll housings in groups. The opening may, for example, be anywhere from a few inches to more than a foot longer than the accumulated overall thikness of the roll housings. The jacks will stack and pack the loosely deposited roll housings together until they are in contact with each other and in this manner the driven roll shafts will be lined up with the driver shafts. The power operated end jacks will clamp all housings tightly togther and also tightly against the entry end of the mill base to take the loads occurring during operation.

The jacks may be mounted on a frame 275 which may be bolted directly to the plate 276 closing the exit end of the well W. The frame 275 includes vertically extending reinforcing plates 277, 278, 279 and 280 which also support reinforcing shelves 281 and 282. The shelf 282 may be segmented as shown so that a cylindrical tube guide may be fitted to such frame guiding the tube in its exit from the mill. An upstanding plate 284 is mounted on the top shelf 282, having a suitable circular aperture cut therein for the tube guide 283 and suitable reinforcing plates may be provided extending between the shelf 282 and such upstanding plate 284 as shown at 285 and 286. A hydraulic drive motor 287 may be mounted on the frame plate 288. The drive shaft of the motor 287 may be coupled directly to a transmission 289 having two output shafts, one such shaft 290 being coupled to a further transmission 291, idetical in form to the transmission 289. Extending vertically from such transmissions are respective drive shafts 292 and 293 which are coupled respectively to worms 294 and 295 which are in driving engagement with the threaded end-jacks 146 and 147 respectively. The worm gear transmission housings may be mounted directly on the upstanding plate 284 and suitable apertures may be provided in the paltes 277, 278, 279 and 280 for the shafts 290, 292 and 293. It will, of course, be understood that the screw jacks 146 and 147 will be freely rotatably engaged within the bridge 141 and that the hydraulic motor 287 will then cause the screw operated jacks to rotate to extend or retract uniformly from the worn gear transmission housings thus longitudinally to move the bridge 141. Such jacks may be protected by flexible boots as shown in FIG. 4.

Movement of the bridge will cause the same to engage the four spacing pads mounted on the face plate of the roll housing 24 as shown at 296 to cause the same to slide along the ways provided by the shelves 122 and 123. Each of the roll housings will be provided on each end thereof with four horizontal spacing pads which are employed to obtain the proper horizontal spacing between the housings. These pads are hardened precision ground and mounted by bolts 297 to the housing end faces. Reference may be had to FIGS. 6, 7 and 10 for a more detailed showing of the hardened pads and their positions on the housings end faces. By replacing such pads with pads of different thickness, it can readily be seen that the spacing between the roll housings can easily be changed. The overall thickness of the housing including the hardened pads will then determine the spacing between the housings. The hydraulically operated end jacks will then stack and clamp the roll housings 1 through 24 with the hardened pads thereof firmly in engagement.

*Assembly (FIG. 1 embodiment)*

With all of the piston-cylinder assemblies 224 extended, the overhead pusher bars will be swung clear of the well W which will permit the insertion of the roll housings into the well. With the base well W cleared, all, one, or a group of any number, of the roll housings may then be deposited within the well. The roll housings in groups, of course, will be preassembled in the proper order prior to placement within the well. The transverse dimension of the well will be sufficient to allow adequate clearance for the loose group depositing of such housings into the well. In the illustrated embodiment, a ¼ inch clearance is provided, but it will, of course, be understood that this may be increased to ½ inch or more for adequate clearance if needed. Prior to the insertion of the groups of roll housings, the bridge 141 actuated by the screw jacks 146 and 147 will have been withdrawn to increase the longitudinal dimension of the well. This longitudinal dimension may provide a sufficient clearance of from a few inches to more than a foot greater than the accumulated overall thicknesses of the deposited roll housings. With such clearances being provided, it can be seen that the roll housings can quickly and easily be deposited within the well W with no concern for the parallelism of the roll housings or for their mill centerline alignment.

With the roll housings loosely deposited in the well in the proper order, the screw jacks 146 and 147 may be operated by the hydraulic motor 287 to cause the bridge to move to confine the longitudinal dimension of the well causing the contact of the bridge with the contact shoes of the roll housing 24. The roll housing 24 will then be slid along the shelves or ways 122 and 123 and it in turn will cause the roll housing 23 similarly to be slid along the ways and successively the roll housings will all be firmly clamped together and clamped against the dead entry end 135 of the mill. Prior to the final clamping by the end-jacks 146 and 147, the piston-cylinder assemblies 224 will be retracted causing the pusher bars to contact the roll housing frames to slide the roll housings against the finished side 201 of the well. In this manner, all of the roll housings will be properly aligned with the centerline C of the mill. It is noted that the pusher bars will have a transverse component force upon the roll housings and also a vertical component force, which forces are substantially equal. In this manner, the finished side of the roll housings will be firmly clamped against the finished side of the well and also the roll housings will firmly be clamped down upon the shelves 122 and 123. With the roll housings thus aligned, the end-jacks can be employed firmly to clamp and hold all of the roll housings against each other and against the dead end 135 of the mill. It can now be seen that with the two different clamping structures shown, the roll housings will automatically be brought into parallelism; aligned with the centerline of the mill; firmly clamped downwardly on the mill base as represented by the shelves 122 and 123; and all of the roll housings will be anchored against forces in a longitudinal direction. In such reducing mills, the force is generally pulling, but with the present invention, a pushing force can equally well be handled. With the clamping devices all of the housings are held tightly against each other and also tightly to the mill base to take whatever load occurs during operation of the mill. With the roll housings thus properly in place, each of the drives may simply and easily be connected. The operations of clamping and stacking the roll housings as well as the connection of the drives can be accomplished by the operator at a position remote from the mill and the present invention obviously requires no operator to be climbing over the mill to be tightening bolts, nuts or other such fastening devices.

It will be understood that the roll housings need not necessarily be deposited vertically from the top of the mill by an overhead crane, but can be, for example, slid longitudinally into the mill from one end or the other in groups by a conveyor or other suitable loading mechanisms. It will also be understood that the roll clusters within the roll housings need not necessarily be driven, but can be idler rollers for use in a pull-through type mill. In such an operation, the rolls would transform strip into tubular form.

*Alternative forms*

Figure 13:
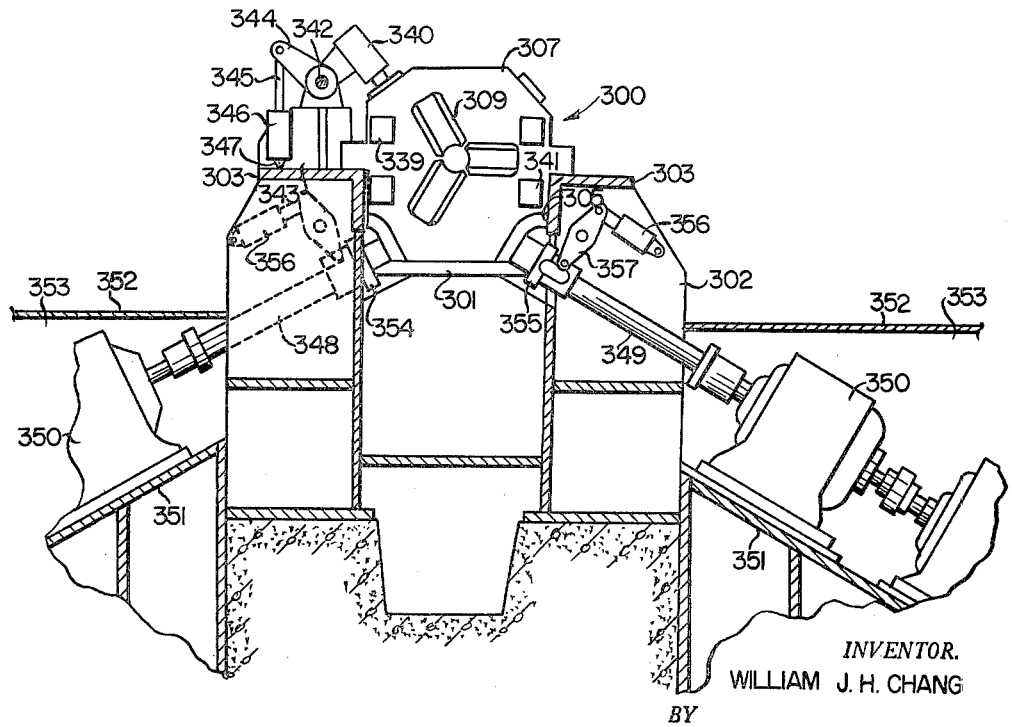
FIG. 13 is a fragmentary transverse section illustrating the drive arrangement employed with roll housings of the type shown in FIGS. 11 and 12.
Figure 8:
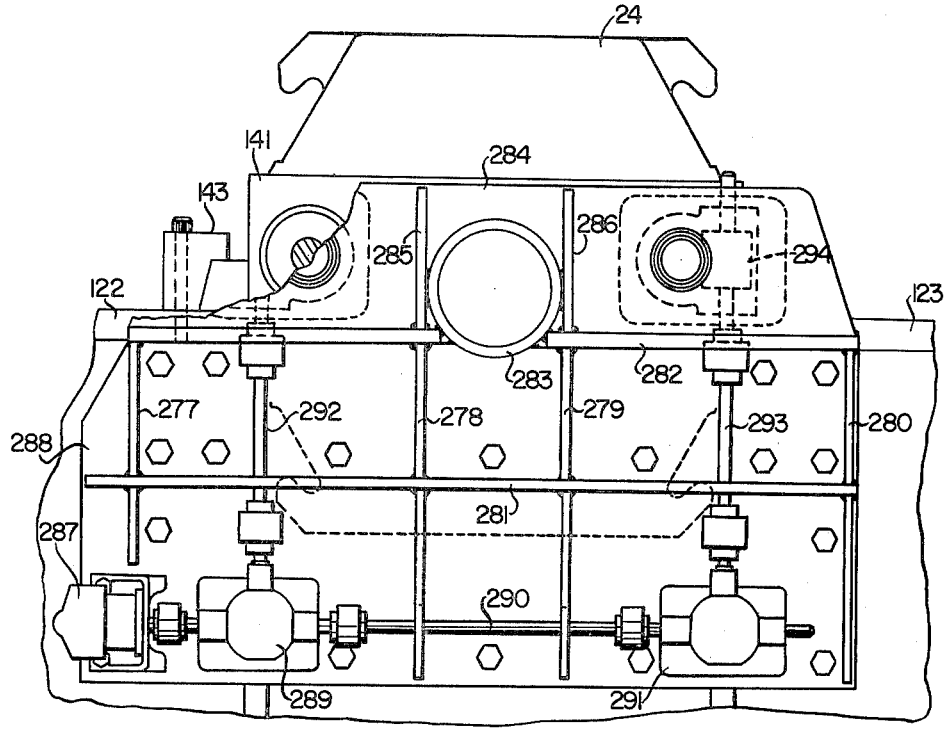
FIG. 8 is a fragmentary end elevation of the mill showing the details of the stacking clamps.
Figure 9:
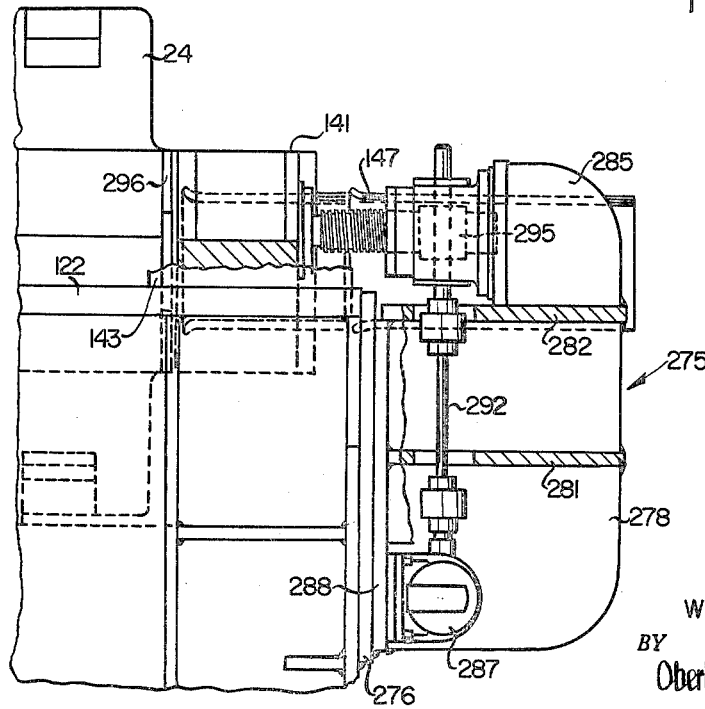
FIG. 9 is a view of such clamps as seen from the left in FIG. 8 partially broken away and in section.

Referring now to FIGS. 11, 12 and 13, it will be seen that a slightly modified form of mill may be provided using a plurality of roll housings 300 stacked within a recess 301 in a base 302. The base 302 may be provided with horizontally extending top shelves 303 and 304 and the inside wall 305 of the recess 301 may be finished to provide a side aligning surface. Each of the roll housings 300 may include a casting 306 and end plates 307 and 308 having the Y-shape openings 309 therein. The casting 306 is provided with three V-shaped webs 310, 311 and 312, the legs of which are provided with apertures therein accommodating bearings supporting roll shafts 313, 314 and 315 having mounted thereon respective rolls 316, 317 and 318, the peripheries of which project through the respective legs of the Y-shape openings 309 in the end plates 307 and 308. The contoured surfaces of the rolls mate to form a circular, or other desired shape, roll pass as shown at 320. The roll shaft 315, in addition to being mounted in bearings in the webs 311 and 312, is also mounted in bearing 321 in an aperture in the inclined bottom wall 322 of the casting 306. The end of the roll shaft 315 is splined as shown at 323.

Bevel gears 324 and 325 keyed to the roll shaft 315 mesh with bevel gears 326 and 327 respectively on the respective roll shafts 313 and 314 so that the drive of shaft 315 will be imparted also to shafts 313 and 314. Access openings may be provided in the casting as shown at 330, 331, 332 and 333. Access opening 331 permits drive access to the shaft ends on which the gears 325 and 327 are mounted and similarly opening 333 may be employed as an access for a drive shaft to be coupled to shafts 313 and 314. A lifting eye 334 may be provided on the top of the roll housing so that one or any number of roll housings may conveniently be placed or stacked within the recess or well in the base 302 in a predetermined order.

It can now be seen that the roll housing can be rotated about a vertically extending axis so that the rolls therein can be driven from either side of the mill. The rolls will be supported on ears 335 and 336 extending aligned with the center of pass 320 from the sides of the housings and it is noted that the opening 331 provides in effect two separated supporting ears 337 and 338 as shown in FIG. 12. Spacing pads 339 which are carefully machined may be mounted on the plates 307 and 308 properly longitudinally to space such roll housings with respect to each other when they are clamped together by the power operated end jacks. The corners of the roll housings are beveled or cut on a diagonal as shown and such corners may be provided with contact pads adapted to engage spring loaded pusher bars 340 as shown in FIG. 13. Such pusher bars may be substantially like those shown in FIGS. 5, 6 and 10 and act to shove the roll housing against the side aligning surface 305. The side surface 341 of each of the roll housings will also be finished carefully so that when the roll housing is laterally shoved against the surface 305, the centerline of each housing will be properly longitudinally aligned.

Referring now to FIG. 13, it will be seen that the pusher bars 340 are keyed on a series of shafts 342 mounted on brackets 343 on the shelf 303. At least one of the pusher bars on each shaft may include crank arms 344, the distal ends of which are pivotally connected to rods 345 of piston-cylinder assemblies 346. The blind ends of such piston-cylinder assemblies may be pivoted to the brackets 343 as shown at 347.

It will be seen in FIG. 13 that the longitudinally extending recess 301 may be provided with openings accommodating the drive shafts 348 and 349 for longitudinally alternate roll housings which extend inclined upwardly from motor driven reducers 350 or the like. Such motors and reducers may be mounted on inclined platforms 351 on each side of the mill and this arrangement permits the operating floor 352 directly laterally adjacent the mill to be completely free of the complex motors and drives, these being positioned in pits 353 beneath such operating floor 352. Shaft coupling members 354 and 355 may be provided on the ends of the drive shafts actuated by piston-cylinder assemblies 356 through levers 357.

In FIG. 14, there is illustrated a slightly modified form of roll stand and mill base wherein the roll stand 358, while similar to the roll stands 1 through 24 of FIG. 1, is provided with a finished side wall 359 and a finished bottom wall 360. The base 361, instead of being provided with a longitudinally extending well or recess having two opposed side walls, is formed with a recess having only one side aligning wall or surface 362 and a finished bottom wall 363. Power operated end jacks may be employed in a similar manner to clamp longitudinally together the various roll housings with the spacing pads 364 properly longitudinally separating such stands. Spring loaded pusher bars 365 are mounted on shafts 366 which are in turn mounted on brackets 367 extending upwardly from the botton wall 363. These pusher bars may be employed to shove the roll housings 358 against the finished side aligning surface 362. Piston-cylinder assemblies 368 may be employed to actuate such pusher bars. Drive shafts 369 and 370 which are vertically offset may be employed to drive the rolls of longitudinally alternate roll housings in the same manner as in the FIG. 1 embodiment. Thus the roll housing receiving recess in the base 361 may be formed by a side aligning wall 362 and the bottom wall 363.

FIG. 15 illustrates an alternative form of shaft coupling that may be employed with the present invention. In such form, the drive shaft 371 is provided at its distal end with an annular plurality of semi-circular radially projecting teeth 372 which engage in lengthened internal grooves 373 in connecting hub member 374. The hub member 374 is provided with internal splines 375 which flare outwardly as shown at 376 readily to mate with the splines 323, for example, of roll shaft 315. A plate 377 separates the two internal portions of the hub 374 and a compression spring 378 extends between such plate and an annular seat 379 in the shaft 371. A locking ring 380 and seal 381 may be employed in the end of the hub member 374. An annular ridge 382 extends about the hub member to be engaged by a yoke or support shifter 252 seen in FIG. 7. In this manner, movement of the hub member longitudinally with respect to the shaft 371 will cause the hub member to become engaged and disengaged with the projecting splined stub shafts of the driven rolls of the roll housings.

It can now be seen that there is provided a method of and apparatus for quickly and easily assembling roll housings in a mill, or disassembling all or any one of such housings for repair or replacement.

Other modes of applying the principle of the invention may be employed, change being made as regards the details described, provided the features stated in any of the following claims or the equivalent of such be employed.

I, therefore, particularly point out and distinctly claim as my invention:

1. A mill having a base provided with a longitudinally extending recess having a finished side wall, a group of roll housings supported on said base within said recess, and means to push said roll housings against said finished wall to align longitudinally said roll housings.

2. The mill set forth in claim 1 including drive means for the rolls of each said roll housing, and means automatically to couple said drive means to its respective roll housing when thus longitudinally aligned.

3. A mill comprising a base having a longitudinally extending recess having a finished side wall, a group of roll housings supported on said base within said recess, and power end-jack means at one end of said recess for longitudinally clamping said roll housings together.

4. The mill as set forth in claim 3 including means laterally to push said roll housings against said finished side wall to align longitudinally said roll housings.

5. The mill as set forth in claim 3 including drive means for each of said roll housings, and means automatically to couple said drive means to said roll housings when thus longitudinally clamped against each other.

6. A forming mill comprising a base having a longitudinally extending well therein, said well having a finished side wall, a group of roll housings loosely deposited on said base and extending within said well, and means for clamping the thus stacked roll housings longitudinally against each other and for pushing such roll housings laterally against the finished wall of said well longitudinally to align said roll housings.

7. The method of constructing a roll stand comprising a group of roll housings in a forming mill comprising the steps of loosely depositing a group of such roll housings in an oversize base, laterally shoving such housings against one longitudinal side of such base longitudinally to align such housings, and longitudinally clamping such housings correctly longitudinally to space such housings.

8. The method of assembling a mill comprising the steps of loosely depositing a group of roll housings on a base with such housings extending within an oversize well therein, laterally moving such housings longitudinally to align the same and then longitudinally clamping such housings together.

9. A method of constructing a roll stand comprised of a group of roll housings in a forming mill comprising the steps of stacking in predetermined order a group of roll housings in a base having a slightly oversize longitudinally extending well therein, laterally pushing said housings against one longitudinal side of such well longitudinally to align such housings, longitudinally clamping the thus stacked housings correctly longitudinally to space such housings, and automatically connecting the rolls of each such housing to a source of power.

10. A method of constructing a roll stand comprised of a group of roll housings in a forming mill comprising the steps of securing spacer pads to a series of roll housings of a predetermined width, loosely stacking such roll housings in a group in a predetermined order, depositing such group of loosely stacked roll housings in mass in a slightly oversize longitudinally extending well in a mill base, laterally shoving such housings against one longitudinal side of such base, longitudinally to align such housings, and longitudinally clamping the thus stacked housings correctly longitudinally to space the same.

11. A method of constructing a roll stand comprised of a group of roll housings in a forming mill having a base comprising the steps of securing spacing pads to the longitudinal faces of a group of roll housings, such spacing pads being of a predetermined thickness and secured to such roll housings so as to be opposed to each other, loosely stacking a group of such housings in a predetermined order, depositing such loosely stacked group in mass in a slightly oversize longitudinally extending well in the mill base, and longitudinally clamping such housings correctly longitudinally to space each such housing.

12. The method set forth in claim 11 including the step of predeterminately longitudinally arranging drive means for each of such roll housings, and automatically coupling such drive means to such roll housings when such housings are thus correctly spaced.

13. The method of claim 12 including the step of laterally shoving such housings against one longitudinal side of such base longitudinally to align such housings while simultaneously exerting a vertical clamping pressure on such housings to hold such housings on such base.

14. The method set forth in claim 11 including the step of exerting a simultaneous vertical and lateral force on such housings simultaneously to shove such housings against one longitudinal side of such base and vertically to clamp such housings on such base.

15. A roll housing receiving base comprising an upstanding frame, a longitudinally extending well in said frame, a bridge closing one end of said well and fixed to said frame, a bridge closing the opposite end of said well and mounted in horizontally extending guide ways, power operated jacks connected to said last-mentioned bridge adapted to move said bridge to clamp longitudinally roll housings within such well.

16. In combination, a roll housing comprising a substantially rectangular frame, horizontally extending supporting ears extending from said frame, and a base having a longitudinally extending well therein, said well being slightly wider than said frame, whereby said frame will fit loosely within said well to be supported on the edges thereof by said support ears.

17. The combination set forth in claim 16 wherein said well has a finished side, and said frame has an opposed finished side, and means laterally to shove said frame within said well to move said finished sides into engagement to align properly said roll housing and said well.

18. The combination set forth in claim 17 wherein said means comprises a pivotally mounted roll housing engaging clamp adapted laterally to push and vertically to clamp said roll housing.

19. The combination set forth in claim 18 wherein said clamp is mounted on a shaft extending parallel to said well and spaced adjacent the top of said roll housing, piston-cylinder means adapted to rotate said shaft thus to rotate said clamp into and out of engagement with said roll housing.

20. The combination set forth in claim 17 including horizontally movable clamp means at one end of said well adapted to clamp longitudinally said roll housing.

21. The combination set forth in claim 20 including a plurality of roll housings thus deposited within such well, said horizontally movable clamp at one end of said well being adapted to clamp said roll housings one against the other within said well.

22. A hot stretch reducing mill or the like comprising a base, a longitudinally extending recess in such base, a bridge at one end of such recess firmly secured to said base and closing said one end of such recess, a longitudinally movable bridge at the opposite end of such recess, power operated jack means connected to said movable bridge longitudinally to move the same, a group of roll housings stacked within such recess in a predetermined order and clamped against said one end by said longitudinally movable bridge, and drive means for each said roll housing, the drive means for alternate roll housings being on opposite sides of the mill.

23. A mill as set forth in claim 22 including horizontal supporting shelves for said roll housings laterally adjacent such recess, said drive means for alternate roll housings being on opposite sides of said shelves.

24. A hot stretch reducing mill or the like comprising a base, a longitudinally extending well having a finished side wall in said base, support shelves on opposite sides of said base, a bridge at one end of such well firmly secured to said base and closing said one end of such well, a longitudinally movable bridge at the opposite end of such well, power operated jack means connected to said movable bridge longitudinally to move the same, a group of forming stands having finished sides stacked within such well supported on said shelves in predetermined order with the finished sides adjacent the finished side wall of such well, spacing pads of predetermined thickness secured to each forming stand, said stands being clamped against said one end and against each other by said longitudinally movable bridge, and clamp means supported on one of said shelves adapted to engage said stands laterally to push said stands against said finished side wall longitudinally to align said stands, said clamp means also clamping said stands on said shelves.

25. A mill as set forth in claim 24 wherein said clamp means includes a longitudinally extending shaft, spring loaded stand engaging members secured to said shaft, and means to rotate said shaft to swing said members from a position vertically clear of such well to a position engaging said stands.

26. A mill having a base with a longitudinally extending receptacle having a side aligning surface, a group of roll housings supported on said base, means laterally to push said roll housings against said side aligning surface to align longitudinally said roll housings.

27. The mill as set forth in claim 26 wherein said receptacle in said base is formed by a floor and one upstanding side wall.

References Cited by the Examiner

UNITED STATES PATENTS

| 394,122 | 12/1888 | Lloyd | 80—1.3 |
|---|---|---|---|
| 1,846,175 | 2/1932 | Asbeck | 80—34 |
| 1,896,674 | 2/1933 | Longwell | 205—25 |
| 1,963,064 | 6/1934 | Statz | 205—25 |
| 2,109,312 | 2/1938 | Dimmick | 205—25 |
| 2,214,279 | 9/1940 | Kocks | 80—34 XR |
| 2,757,556 | 8/1956 | Uebing | 80—54 XR |
| 2,787,176 | 4/1957 | Smith | 80—31.1 |
| 2,821,277 | 1/1958 | Hughes | 192—67 |
| 2,844,238 | 7/1958 | Peterson | 192—67 |
| 2,942,506 | 6/1960 | Merting et al. | 80—35 |
| 3,136,182 | 6/1964 | Wegmann et al. | 80—1.3 |

FOREIGN PATENTS 832,329 4/1960 Great Britain.

CHARLES W. LANHAM, *Primary Examiner.*

LEON PEAR, WILLIAM J. STEPHENSON, *Examiners.*